Figure 1:
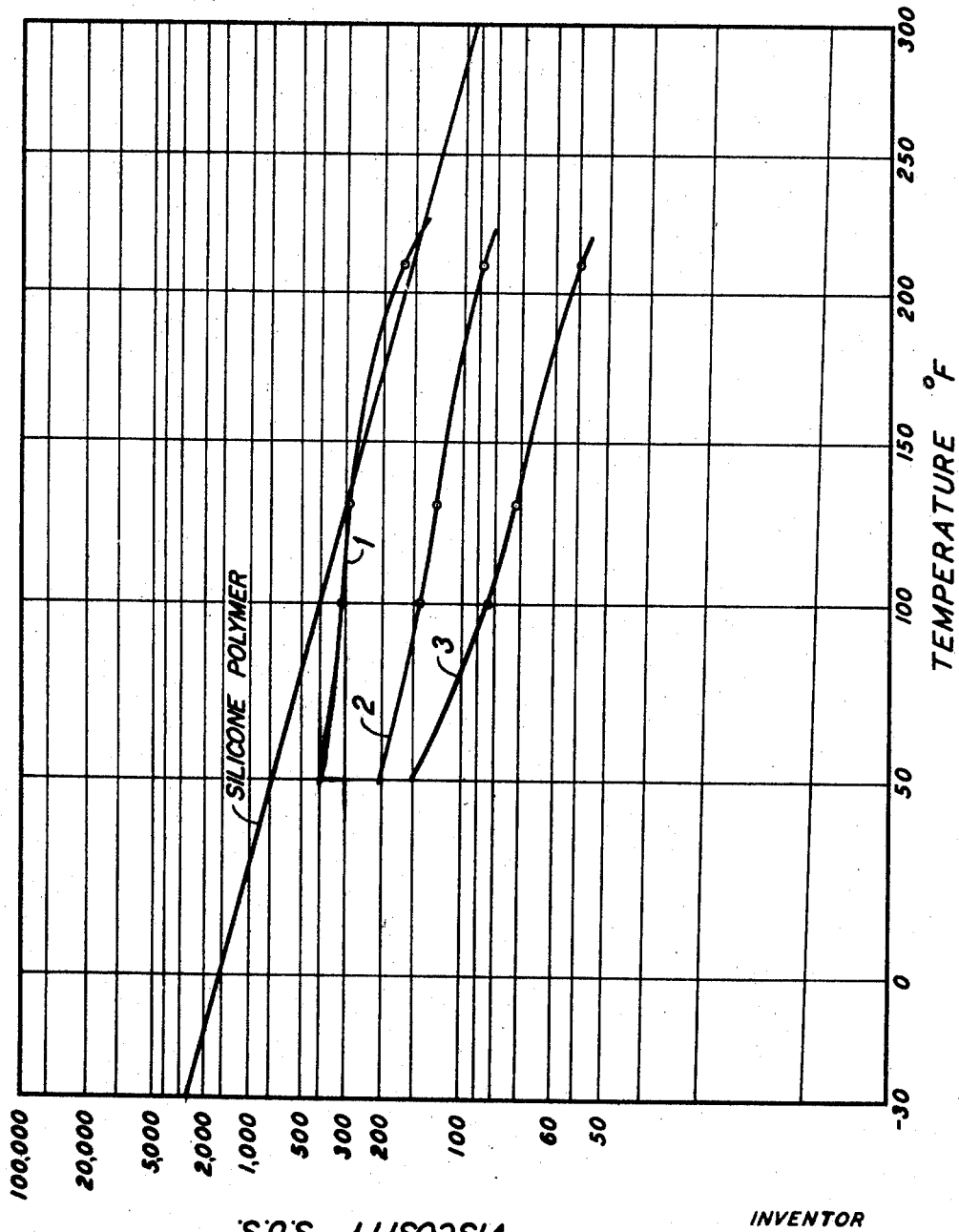

Patented Nov. 29, 1949

2,489,281

UNITED STATES PATENT OFFICE 2,489,281

METHACRYLATES IN CONSTANT VISCOSITY OILS

Edward G. Foehr, Berkeley, Calif., assignor to California Research Corporation, San Francisco, Calif., a corporation of Delaware Application April 4, 1947, Serial No. 739,293

11 Claims. (Cl. 252—37)

This invention relates to new and useful compositions having value as lubricants, insulating oils, hydraulic oils and the like, which are characterized by relatively small change of viscosity over broad ranges of temperature.

It is an object long sought in the art to produce lubricants and the like which exhibit little change of viscosity over a wide range of temperatures. Thus, in any application where a lubricant, insulating oil or the like is subjected in use to wide variations of temperature, it is desirable that the lubricant, insulating oil or the like have not too high a viscosity at the lower temperatures nor too low a viscosity at the higer temperatures. Thus, by way of example, a transformer oil, used to insulate and conduct heat away from the windings of a transformer, may be subjected to sub-zero temperatures in winter and to high temperatures during hot weather and while the transformer is dissipating a large amount of heat. If the oil becomes too viscous, it will not conduct heat readily. Hydraulic oils may be subjected to temperatures much below normal atmospheric (as in aircraft flying at high altitudes) or to elevated temperatures. If the oil becomes unduly viscous, it becomes sluggish and less responsive to mechanical pressure. In the operation of any machinery where the oil may become cold while the machinery is at rest and may become hot while the machinery is in operation, the oil may become so viscous and sluggish at low temperatures as to impede starting and acceleration and to cause excessive wear, or it may become so thin at high temperatures as not to provide sufficient "oiliness" for efficient lubrication.

As applied to hydrocarbon oils, these ends have been fulfilled in some measure in the past by various expedients, such as selecting base stocks (paraffinic) having high viscosity index (V. I.), refining oils to remove constituents which impart low V. I., and adding V. I. improvers. Most such means have fallen far short of the desired goal of a lubricant exhibiting relatively little viscosity change over a wide range of temperatures; the slope of the viscosity-temperature curve (reflecting change of viscosity with temperature) is reduced but not to anything approaching zero. Also, those methods which rely upon selection of base stock exclude a large class of hydrocarbon oils (aromatic, naphthenic, etc.), which except for their low V. I., have good properties as lubricants, insulating oils, etc. Those methods relying upon refining suffer loss of valuable hydrocarbon and non-hydrocarbon constituents (removed by the refining) and entail the use of expensive treating plants and chemicals.

It is an object of this invention to provide lubricants, insulating oils, hydraulic oils, castor machine oils, "Vistac" oils, drilling oils, gear lubricants, dash pot oils, scientific instrument lubricants, shock absorber oils and the like which exhibit relatively little change of viscosity over a wide range of temperatures.

It is a further object of the invention to provide a means whereby, starting from a hydrocarbon base stock and certain additive materials to be incorporated in the base stock in small amount, an oil can be produced exhibiting relatively little change of viscosity over a wide range of temperatures, which range of temperatures may be in the higher, lower or intermediate regions of temperature, as desired.

It is a particular object of the invention to provide means whereby a wide variety of petroleum lubricating oils, and in particular, aromatic or naphthenic type petroleum lubricating oils, can be modified to produce oils exhibiting relatively small change of viscosity over a wide range of temperatures.

It is a further particular object of the invention to provide lubricants and the like which, over an extended range of temperature, exhibit an increase in viscosity with rise of temperature.

These and other objects of the invention will be apparent from the ensuing description and the appended claims.

In accordance with the invention, a hydrocarbon oil of suitable viscosity is selected as the base stock, and in this is stably dispersed a high molecular weight polymer of an ester of acrylic or methacrylic acid and an oil-soluble polyvalent metal soap.

The hydrocarbon oil may have a viscosity of about 30 S. S. U. at 100° F. to 200 S. S. U. at 210° F., although oils of lower or higher viscosity may be required upon occasion. Preferably, this oil has a viscosity of 30 to 110 S. S. U. at 100° F. Petroleum and non-petroleum, natural and synthetic oils may be used; e. g., petroleum distillates from paraffinic, naphthenic, aromatic or mixed base crude petroleum, ranging from gas oils to cylinder oils; olefin polymers such as polypropylenes and polybutenes; amyl naphthalene; the lubricating fractions from synthetic petroleums (Fischer-Tropsch process, etc.), etc. However, pertoleum lubricating oils are preferred, and of these the more aromatic type are preferred because of their lower cost and their greater solvent power for the less oil-soluble polymers. For example, most advantageous are those having about a 130°–160° F. aniline point, 30–110 S. S. U. at 100° F., or more viscous oils of equivalent aromaticity which will have higher aniline points.

The polymers dispersed in the oil are polymers of acrylic esters ($CH_2=CH \cdot COOR$) or methacrylic esters

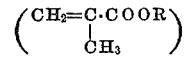

wherein R represents an esterifying radical.

Mixtures of acrylic ester polymers and methacrylic ester polymers and copolymers of acrylic and methacrylic esters may also be used. Similarly, polymers derived from esters of other homologues of acrylic acid may be used, such as ethylacrylic acid, propylacrylic acid, etc.

The preferred polymers are polymers of methacrylic esters in which the esterifying radical, R, contains not less than four carbon atoms, most advantageously, not less than eight carbon atoms. The preferred polymers are also such as are miscible in all proportions with light mineral oils (30 to 500 S. S. U./100° F.).

Examples of suitable polymers are mineral oil soluble polymers of isobutyl acrylate, hexyl acrylate, octyl acrylate, lauryl acrylate, cetyl acrylate; of isobutyl methacrylate, amyl methacrylates, n- and isohexyl methacrylates, n- and iso-octyl methacrylates, n-decyl methacrylate, lauryl methacrylate and cetyl methacrylate; copolymers of any two or more of these methacrylates; and copolymers of any of these acrylates with any of these methacrylates.

The compositions of the invention comprise, in addition to the hydrocarbon oil and polymer, an oil-soluble soap, which may be considered as a dispersing agent; such soaps cooperate with the acrylate and methacrylate polymers to modify the viscosity characteristics of the oil, whereby the composition exhibits relatively little change of viscosity over a wide range of temperatures. The preferred dispersing agents are oil-soluble polyvalent metal soaps of fatty acids, such as aluminum mono-, di- and tri-oleates; aluminum mono-, di- and tri-laurates; magnesium mono- and di-oleates. The preferred soaps are the aluminum soaps and of these, the oleates are the best. Oil-soluble soaps of naphthenic acids, such as those derived from petroleum stocks, are also suitable. In general, oil-soluble soaps which (in the concentrations used) do not greatly thicken mineral oils give the best results; most advantageous are oil-soluble soaps of high molecular weight acids.

Aluminum "tri-soaps" are believed to be mixtures of di-soap, mono-soap and free fatty acid.

The compositions of the invention may also contain a corrosion and oxidation inhibitor, such as 2-tertiary butyl-4-methyl phenol, or tertiary-butyl catechol, and an agent such as cetyl mercaptan to inhibit corrosion of copper by the soap.

The proportions in which these ingredients may be used vary within fairly broad limits, depending upon factors such as solubility of the polymer in the oil, the viscosity desired in the final product and tendency of higher proportions of the soap to cause gelling. In general, in 100 parts by weight of finished composition, the polymer will constitute 2 to 8 parts, 5 being preferred; the soap, 3 to 6 parts; the oxidation-corrosion inhibitors, quite small amounts, such as 0.1 to 0.2% of each; and the mineral oil, quantity sufficient to make 100 parts.

In blending these ingredients, various procedures may be employed, of which the following is preferred: The oil soluble soap, mineral oil and inhibitors are mixed at 160°–180° F. until homogeneous. The polymer is then added, the temperature increased to about 220°–230° F. (or higher, depending upon the flash point of the mineral oil base stock), and the composition stirred for about 30 minutes.

The following specific examples will serve further to illustrate the practice and advantages of the invention.

EXAMPLE 1

Blends were made using an isobutyl methacrylate polymer. Compositions of these blends are given in Table I below. The products were prepared by the preferred procedure described above.

Table I

| Composition, Weight Per cent | Blend Number | | |
|---|---|---|---|
| | 1 | 2 | 3 |
| Isobutyl methacrylate polymer | 2 | 2 | 2 |
| Aluminum di-oleate | | | 2 |
| Aluminum tri-oleate | 3 | 3 | |
| Lauric acid | | 0.1 | |
| Mineral oil [1] | 95 | 94.9 | 96 |

[1] This mineral oil was a blend of sulfuric acid treated distillates from a California wax-free naphthenic type crude. The viscosity of the blend was 35.4 S. S. U. at 100° F. and the aniline point was 131° F. This base oil was prepared by selecting a distillate of the approximate viscosity desired in the final oil and treating this lightly with sulfuric acid followed by neutralization with sodium hydroxide to yield the desired aniline point. The oils were then washed and finally given a light clay treatment.

The lauric acid in blend No. 2 functioned to lower the viscosity of the blend by solubilizing the soap.

In Fig. 1 of the drawings are shown viscosity-temperature (V-T) curves of these blends and, for comparison, of a silicone polymer. In Fig. 1, abscissae represent temperatures (° F.) and ordinates represent viscosities (S.S.U.). The scale is that of ASTM Standard Viscosity-Temperature Chart (D341-39).

EXAMPLE 2

Blends were prepared, employing the same procedure as in Example 1, from a methacrylate polymer, aluminum trioleate and mineral oil. Composition and properties are given in Table II. The methacrylate polymer employed was a solution of 55% octyl methacrylate polymer in mineral lubricating oil, having a viscosity of 55 centistokes at 100° F., as described in the booklet, "Acryloid-HF," a publication of the Rohm and Haas Company. The mineral oil was the same as that of Example 1.

Table II

Figure 2:
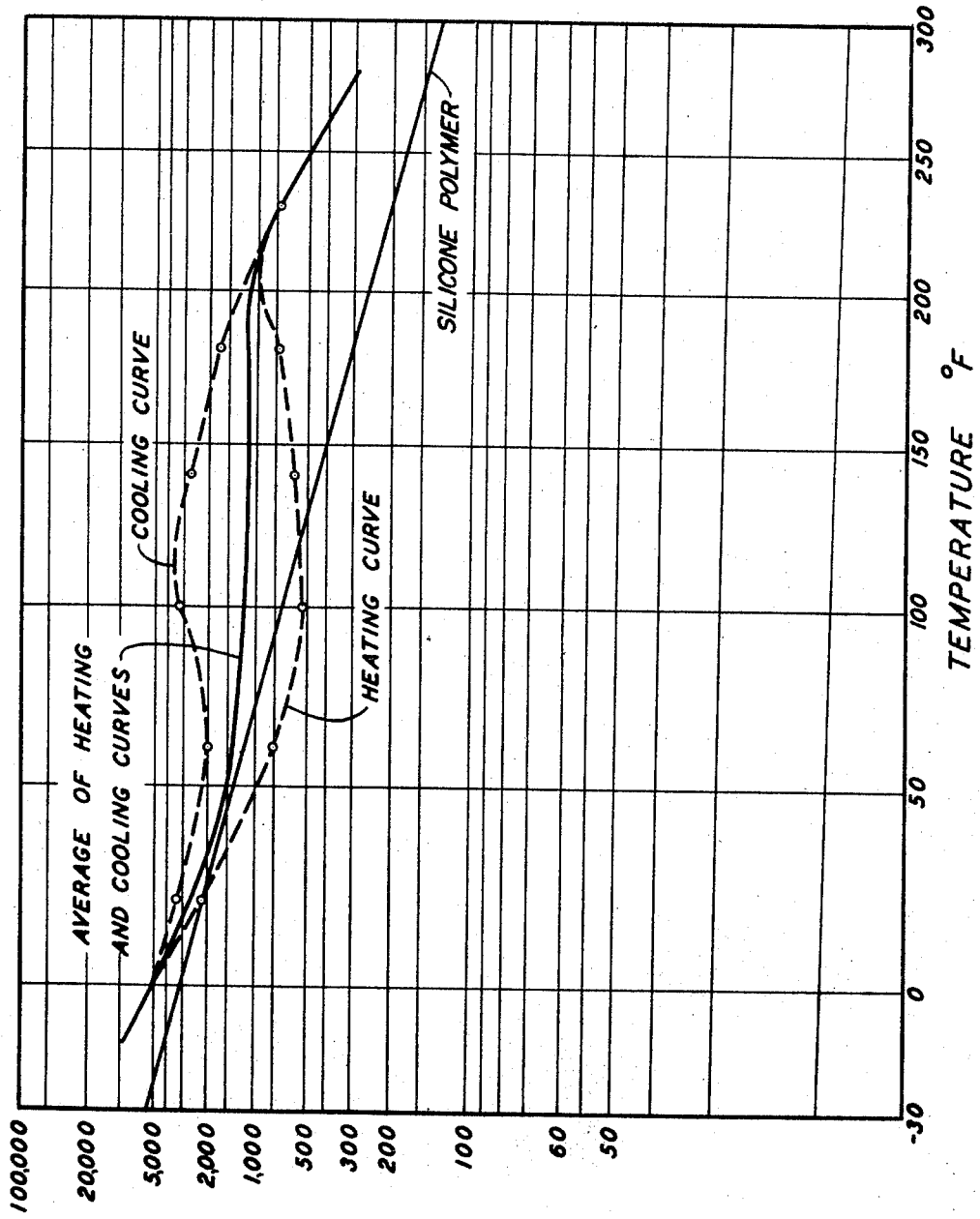

Composition, wt. per cent:
 Octyl methacrylate polymer _____ 15
 Al trioleate (50% concentrate in mineral lubricating oil) _____ 12
 2-tertiary butyl-4-methyl phenol __ 0.2
 Cetyl mercaptan __ 0.2
 Mineral oil _____ 72.6
Properties:
 Gravity, °API ____ 32.9
 Flash, ° F. _____ 210
 Fire, ° F. _____ 225
 Pour point, ° F. __ −70
 Per cent water ____ 0.05
 Metal corrosion ___ Non-corrosive to aluminum, copper, magnesium, and steel
 Oiliness (K. O. T. M.—cast iron on steel) _____ 40–50% less than base oil In Fig. 2 of the drawings are shown V-T curves (same chart and scale as in Fig. 1) of the blend of Example 2 and of a silicone polymer similar to that of Fig. 1. The curve for the blend of Example 2 is actually an average of the heating and cooling curves, which varied somewhat from the average curve of Fig. 2. Thus, the heating curve dropped below the average curve at 0° C., reached a minimum viscosity of 500 S.S.U. at 100° F., and rose again, meeting the average curve at about 210° F. The cooling curve rose above the average curve at about 210° F., reached a maximum viscosity of about 3500 S.S.U. at about 110° F. and dropped again, coinciding with the average curve at 0° C.

The preferred compositions of the invention, such as illustrated by the blend of Example 2, have the additional important advantages, that they can be exposed to rapid temperature changes and to high and low temperatures and can be diluted with further quantities of the base oil without precipitation of the polymer. Such dilution will lower the viscosity of the composition and will also increase the slope of the V-T curve.

Another example of a polymer which has yielded products having a desirable combination of properties is the polymer described in the booklet, "Acryloid 150," a publication of the Rohm and Haas Company.

Among important modifications of the invention may be mentioned the use of an anti-gelling agent which lowers the viscosity level of the product without, however, impairing the V-T properties thereof. Among such agents are oleic acid, glycerol monostearate, dialkyl tartrates such as dioctyl tartrate, water, alkyl substituted catechols such as lauryl catechol, etc. These agents are preferably incorporated in the product by mixing with the hydrocarbon oil and soap before addition of the polymer. Preferably they are used in amounts of about 0.1 to 1% by weight of the finished product. The function of these agents is to decrease the gel-forming tendencies of the soap component.

I claim:

1. A normally liquid composition of lubricating oil viscosity having superior viscosity-temperature characteristics consisting essentially of, by weight, about 2 to 8 parts of a high molecular weight oil-soluble polymer of a material selected from the group consisting of alkyl esters of acrylic acid and alkyl esters of homologues of acrylic acid, the alkyl radical of said alkyl esters containing at least 4 carbon atoms, and said polymer being miscible in all proportions with light mineral oils of viscosities between 30 and 500 S. S. U. at 100° F.; about 3 to 6 parts of an oil-soluble soap of acid material selected from the group consisting of high molecular weight fatty acids and naphthenic acids, and a polyvalent metal selected from the group consisting of aluminum and magnesium; and sufficient hydrocarbon lubricating oil having a viscosity ranging from about 30 to about 110 S. S. U. at 100° F. to make 100 parts of composition.

2. A composition substantially as described in claim 1 wherein the oil-soluble soap is a soap of a high molecular weight fatty acid and a polyvalent metal selected from the group consisting of aluminum and magnesium.

3. A composition substantially as described in claim 1 wherein the oil-soluble soap is a soap of a naphthenic acid and a polyvalent metal selected from the group consisting of aluminum and magnesium.

4. A composition substantially as described in claim 1 wherein the alkyl radicals of the alkyl esters contain 8 to 16 carbon atoms.

5. A composition substantially as described in claim 1 wherein the polymer has a viscosity between 55 and 5,750 centistokes at 100° F.

6. A composition substantially as described in claim 5 wherein the polymer is an alkyl methacrylate polymer miscible in all proportions with a mineral oil having a viscosity of between 30 and 500 S. S. U. at 100° F.

7. A composition substantially as described in claim 1 wherein the soap is a soap of aluminum and a high molecular weight fatty acid.

8. A composition substantially as described in claim 7 wherein the soap is aluminum trioleate.

9. A composition substantially as described in claim 1 wherein the polyvalent metal is magnesium.

10. A composition substantially as described in claim 1 wherein the hydrocarbon oil is a petroleum lubricating oil.

11. A composition substantially as described in claim 1 wherein the hydrocarbon oil has a viscosity of about 30 S. S. U. at 100° F. to 200 S. S. U. at 210° F.; the soap is a soap of aluminum and a high molecular weight fatty acid; and the polymer is an alkyl methacrylate polymer miscible in all proportions with a mineral oil having a viscosity of between 30 and 500 S. S. U. at 100° F.

EDWARD G. FOEHR.

REFERENCES CITED

The following references are of record in the file of this patent:

UNITED STATES PATENTS

| Number | Name | Date |
| --- | --- | --- |
| 2,031,986 | Stratford | Feb. 25, 1936 |
| 2,041,076 | Lincoln | Mar. 19, 1936 |
| 2,091,423 | Bruson | Sept. 3, 1940 |
| 2,122,940 | Hodson | July 5, 1938 |
| 2,189,873 | Zimmer | Feb. 13, 1940 |
| 2,204,601 | Kavanagh | June 18, 1940 |
| 2,212,423 | Wiezevich | Sept. 3, 1940 |
| 2,227,149 | Murphree | Dec. 31, 1940 |
| 2,274,673 | Earle | Mar. 3, 1942 |
| 2,275,123 | Zimmer | Mar. 3, 1942 |
| 2,370,299 | Farrington | Feb. 27, 1945 |
| 2,385,697 | Flaxman | Sept. 25, 1945 |
| 2,418,894 | McNab | Apr. 12, 1947 |
| 2,456,642 | Merker | Dec. 21, 1948 |